US012778832B2

(12) United States Patent
Sankai

(10) Patent No.: US 12,778,832 B2
(45) Date of Patent: Nov. 3, 2026

(54) FUNCTION IMPROVEMENT ASSISTANCE APPARATUS AND FUNCTION IMPROVEMENT ASSISTANCE METHOD

(71) Applicant: CYBERDYNE Inc., Tsukuba (JP)

(72) Inventor: Yoshiyuki Sankai, Tsukuba (JP)

(73) Assignee: CYBERDYNE Inc., Tsukuba (JP)

( * ) Notice: Subject to any disclaimer, the term of this patent is extended or adjusted under 35 U.S.C. 154(b) by 323 days.

(21) Appl. No.: 18/727,460

(22) PCT Filed: Dec. 1, 2022

(86) PCT No.: PCT/JP2022/044404
§ 371 (c)(1),
(2) Date: Jul. 9, 2024

(87) PCT Pub. No.: WO2023/139941
PCT Pub. Date: Jul. 27, 2023

(65) Prior Publication Data

US 2025/0090404 A1 Mar. 20, 2025

(30) Foreign Application Priority Data

Jan. 18, 2022 (JP) ................................ 2022-005784

(51) Int. Cl.
*A61H 1/02* (2006.01)
*A61H 3/00* (2006.01)

(52) U.S. Cl.
CPC ............ *A61H 1/0262* (2013.01); *A61H 3/00* (2013.01); *A61H 2201/0157* (2013.01); *A61H 2201/165* (2013.01); *A61H 2201/1652* (2013.01); *A61H 2230/085* (2013.01)

(58) Field of Classification Search
CPC .. A61H 2201/1652; A61H 3/008; A61H 3/00; A61H 1/024; A61H 2201/1621; A61H 2201/163; A61H 2201/1635; A61H 2201/1642; A61H 1/0262; A61H 2201/165; A61H 2201/5069; A61H 2201/164; A61H 2201/0192; A61H 2003/007; A61H 2230/085; A61H 2201/0157; A61H 2201/1623; A61H 2201/1628; A61H 1/0244; A61H 2201/5007; A61H 2201/5084; A61F 2/72; A61F 2/64; G16H 20/30; G16H 40/63
USPC .................................. 482/54, 51, 69, 3, 906
See application file for complete search history.

(56) References Cited

U.S. PATENT DOCUMENTS

2006/0211956 A1 9/2006 Sankai

FOREIGN PATENT DOCUMENTS

JP 2005-095561 A 4/2005
WO WO-2012118143 A1 * 9/2012 ............ A61B 5/112

OTHER PUBLICATIONS

International Search Report received in PCT/JP2022/044404 dated Jan. 10, 2023, 5 pages (with translation).

* cited by examiner

*Primary Examiner* — Madison Matthews
(74) *Attorney, Agent, or Firm* — Procopio, Cory, Hargreaves & Savitch LLP

(57) ABSTRACT

The present invention allows a subject to enjoy a sense of accomplishment of improvement in a gait function while viewing and listening to motion advice for improving the gait function when the subject participates in rehabilitation through gait motion using a wearable motion support apparatus.

10 Claims, 9 Drawing Sheets

FIG. 5

| *Patient ID* | *Disease* | *Sex* | *Height* [cm] | *Weight* [kg] | *The number of 2MWT results* |
|---|---|---|---|---|---|
| A | MD | male | 163.7 | 81.3 | 9 |
| B | ALS | female | 162.8 | 51.4 | 9 |
| C | IBM | male | 159.7 | 59.4 | 3 |
| D | MD | male | 177.5 | 91.7 | 7 |
| E | MD | female | 163.3 | 60.0 | 4 |
| F | SBMA | male | 166.2 | 64.3 | 6 |
| G | MD | female | 156.6 | 70.5 | 4 |

(A)

(B)

FUNCTION IMPROVEMENT ASSISTANCE APPARATUS AND FUNCTION IMPROVEMENT ASSISTANCE METHOD

CROSS-REFERENCE TO RELATED APPLICATIONS

This application is a U.S. national stage application of International Application No. PCT/JP2022/044404, filed Dec. 1, 2022, which claims benefit of priority from JP 2022-005784, filed Jan. 18, 2022, the contents of both which are incorporated herein by reference.

TECHNICAL FIELD

The present invention relates to a function improvement assistance apparatus and a function improvement assistance method and in particular proposes a function improvement assistance apparatus and a function improvement assistance method for encouraging a subject to willingly participate in rehabilitation through gait motion using a wearable motion support apparatus.

BACKGROUND ART

Progressive neuromuscular diseases such as amyotrophic lateral sclerosis (ALS) and muscular dystrophy (MD) are caused by disorders of nerves and muscles and associated with gradual loss in muscle strength and impairment of a motor function. There is no definitive treatment for these diseases, and medication can at most only suppress the natural progression of symptoms.

In related art, various power assistance apparatuses for supporting motion of or acting on behalf of persons with physical disability who have lost muscle strength, elderly persons whose muscles have weakened, or the like, have been in widespread use. As such power assistance apparatuses, for example, a wearable motion support apparatus capable of controlling and supporting motion based on bioelectrical potentials associated with voluntary muscle activity in accordance with intention of a wearer has been proposed (see Patent Literature 1).

In recent years, treatment using such a wearable motion support apparatus has been practiced for the purpose of maintaining and improving a gait function of a patient with a progressive neuromuscular disease. The wearable motion support apparatus supports gait motion by moving integrally with the patient based on physiological/kinetic information such as bioelectrical signals (BESs) of muscles of the lower extremity, joint angles, and floor reaction force.

A subject who wears the wearable motion support apparatus can repeat gait based on intention of motion of the patient without loading on a neuromuscular system. This enables treatment such that structural development and enhancement of a neural loop are promoted via the wearable motion support apparatus and activation of a nervous system leads to maintenance and improvement of a motor function of the patient.

CITATION LIST

Patent Literature

Patent Literature 1: Japanese Patent Laid-Open No. 2005-95561

SUMMARY OF INVENTION

Technical Problem

By the way, in the rehabilitation through the gait motion of the subject using the wearable motion support apparatus, the subject is always distracted by various thoughts rather than focusing his/her attention on the gait motion.

If those thoughts can be concentrated on improvement in treatment through the rehabilitation, a treatment effect increases, and rapid recovery can be achieved. However, it is conceivable that merely providing advices for encouraging the gait motion is not likely to be effective in improving the subject's motivation.

It is desirable that the subject recognizes an improved status of the gait motion in a feedback manner by himself/herself so as to make the gait function closer to an ideal state while actually participating in rehabilitation through the gait motion using the wearable motion support apparatus.

The present invention has been made in view of the above points and is directed to proposing a function improvement assistance apparatus and a function improvement assistance method capable of allowing a subject to recognize an improved status of a gait function and capable of being utilized for mental improvement for the subject when feels a sense of accomplishment of the improved status.

Solution to Problem

To solve such a problem, the present invention provides a function improvement assistance apparatus using a wearable motion support apparatus that provides to a subject, power in accordance with each of gait phases constituting gait motion of the subject, the wearable motion support apparatus including a drive unit that actively or passively performs driving in coordination with lower extremity motion of the subject, a biological signal detection unit disposed in a region of a body surface of the subject based on joints associated with the lower extremity motion of the subject and including electrodes for detecting a biological potential signal of the subject, a voluntary control unit that causes the drive unit to generate power in accordance with a will of the subject based on the biological potential signal acquired by the biological signal detection unit, a periarticular detection unit that detects a physical amount around the joints associated with the lower extremity motion of the subject based on an output signal from the drive unit, an autonomous control unit that determines each of the gait phases in accordance with a gait task of the subject based on the physical amount detected by the periarticular detection unit and causes the drive unit to generate power corresponding to each of the gait phases, a drive current generation unit that synthesizes a control signal from the voluntary control unit and a control signal from the autonomous control unit and supplies a drive current in accordance with the synthesized control signal to the drive unit, a gait synchronization calculation unit that calculates a gait cycle of the subject based on a detection result of a floor reaction force sensor that detects a pressure distribution to sole surfaces of right and left feet of the subject, a signal normalization unit that normalizes the biological potential signal detected by the biological signal detection unit to a first signal pattern expressed in a planar coordinate system of time and an amplitude for each gait cycle based on the physical amount detected by the periarticular detection unit and the gait cycle calculated by the gait synchronization calculation unit, a difference calculation unit that compares the first signal pattern obtained from the signal normalization unit and a second signal pattern corresponding to a healthy subject who serves as a reference and calculates a difference in a signal level for each gait time point in the gait cycle based on the comparison result, a motion advice generation unit that generates motion advice in the gait cycle so as to make the first signal pattern closer to the second signal pattern in a match direction and so as to reduce a difference amount at the same time based on the calculation result of the difference calculation unit, and a motion advice presentation unit that converts the motion advice generated by the motion advice generation unit into one or both of image information and speech information and presents the one or both of the image information and the speech information to the subject.

As a result of this, with the function improvement assistance apparatus, when the subject participates in rehabilitation through the gait motion using the wearable motion support apparatus, the subject can enjoy a sense of accomplishment of improvement in the gait function while viewing and listening to the motion advice for improving the gait function.

Further in the present invention, the motion advice generation unit generates the motion advice mainly about a motion aspect including a gait time point at which a deviation rate of the difference amount is the highest among motion aspects constituting the gait cycle.

As a result of this, with the function improvement assistance apparatus, it is possible to present optimal motion advice to the subject by generating the motion advice mainly about the motion aspect that should be most improved in the gait cycle in units of one step.

Further, in the present invention, the motion advice presentation unit converts the motion advice into an image representing the match direction and the difference amount of the first signal pattern with respect to the second signal pattern as the image information so as to be displayed in a superimposed manner on the first signal pattern and the second signal pattern normalized in the planar coordinate system by the signal normalization unit.

As a result of this, with the function improvement assistance apparatus, the subject can confirm his/her gait motion one step at a time while viewing as a normalized planar image, how much degree the first signal pattern corresponding to his/her gait motion is different from the second signal pattern corresponding to gait motion of the healthy subject.

Further, in the present invention, a point setting unit tallies up a degree of reduction in a difference at each gait time point in the gait cycle based on a calculation result of the difference calculation unit obtained in a feedback manner and sets a point in accordance with the tally result.

As a result of this, with the function improvement assistance apparatus, in accordance with improvement in the gait function of the subject by the gait motion using the wearable motion support apparatus, by adding a point in accordance with the improved status, it is possible to improve a sense of accomplishment of the subject and lead to mental improvement.

Further, in the present invention, the point setting unit performs charging processing of giving the set point back as part of a usage fee of the wearable motion support apparatus. As a result of this, with the function improvement assistance apparatus, the subject can receive an incentive of being able to reduce the usage fee in proportion to a treatment effect while participating in rehabilitation through the gait motion using the wearable motion support apparatus, so that it is possible to contribute to improvement in motivation when the subject works to rehabilitate himself/herself.

Further, the present invention provides a function improvement assistance method using a wearable motion support apparatus that provides to a subject, power in accordance with each of gait phases constituting gait motion of the subject, the wearable motion support apparatus including a drive unit that actively or passively performs driving in coordination with lower extremity motion of the subject, performing synthesized control of voluntary control of causing the drive unit to generate power in accordance with a will of the subject based on a biological potential signal acquired from a region of a body surface of the subject based on joints associated with the lower extremity motion of the subject and autonomous control of determining each of the gait phases in accordance with a gait task of the subject based on a physical amount around the joints associated with the lower extremity motion of the subject detected based on an output signal of the drive unit and causing the drive unit to generate power corresponding to each of the gait phases and supplying a drive current in accordance with the synthesized control to the drive unit, the function improvement assistance method including a first step of normalizing the biological potential signal to a first signal pattern expressed in a planar coordinate system of time and an amplitude for each gait cycle based on a gait cycle calculated based on the physical amount around the joints and a detection result of a pressure distribution to sole surfaces of right and left feet of the subject, a second step of comparing the first signal pattern obtained from the first step and a second signal pattern corresponding to a healthy subject who serves as a reference and calculating a difference in a signal level for each gait time point in the gait cycle based on the comparison result, a third step of generating motion advice in the gait cycle so as to make the first signal pattern closer to the second signal pattern in a match direction and so as to reduce a difference amount at the same time based on the calculation result in the second step, and a fourth step of converting the motion advice generated in the third step into one or both of image information and speech information and presenting the one or both of the image information and the speech information to the subject.

As a result of this, with the function improvement assistance method, when the subject participates in rehabilitation through the gait motion using the wearable motion support apparatus, the subject can enjoy a sense of accomplishment of improvement in the gait function while viewing and listening to the motion advice for improving the gait function.

Advantageous Effects of Invention

According to the present invention, it is possible to implement a function improvement assistance apparatus and a function improvement assistance method not only capable of improving a gait function of a subject but also capable of being utilized for mental improvement of the subject.

BRIEF DESCRIPTION OF DRAWINGS

FIG. 5 is a table indicating information regarding a subject.

DESCRIPTION OF EMBODIMENT

One embodiment of the present invention will be described in detail below concerning the drawings.

(1) Configuration of Gait Assistance System According to Present Embodiment

Figure 1:
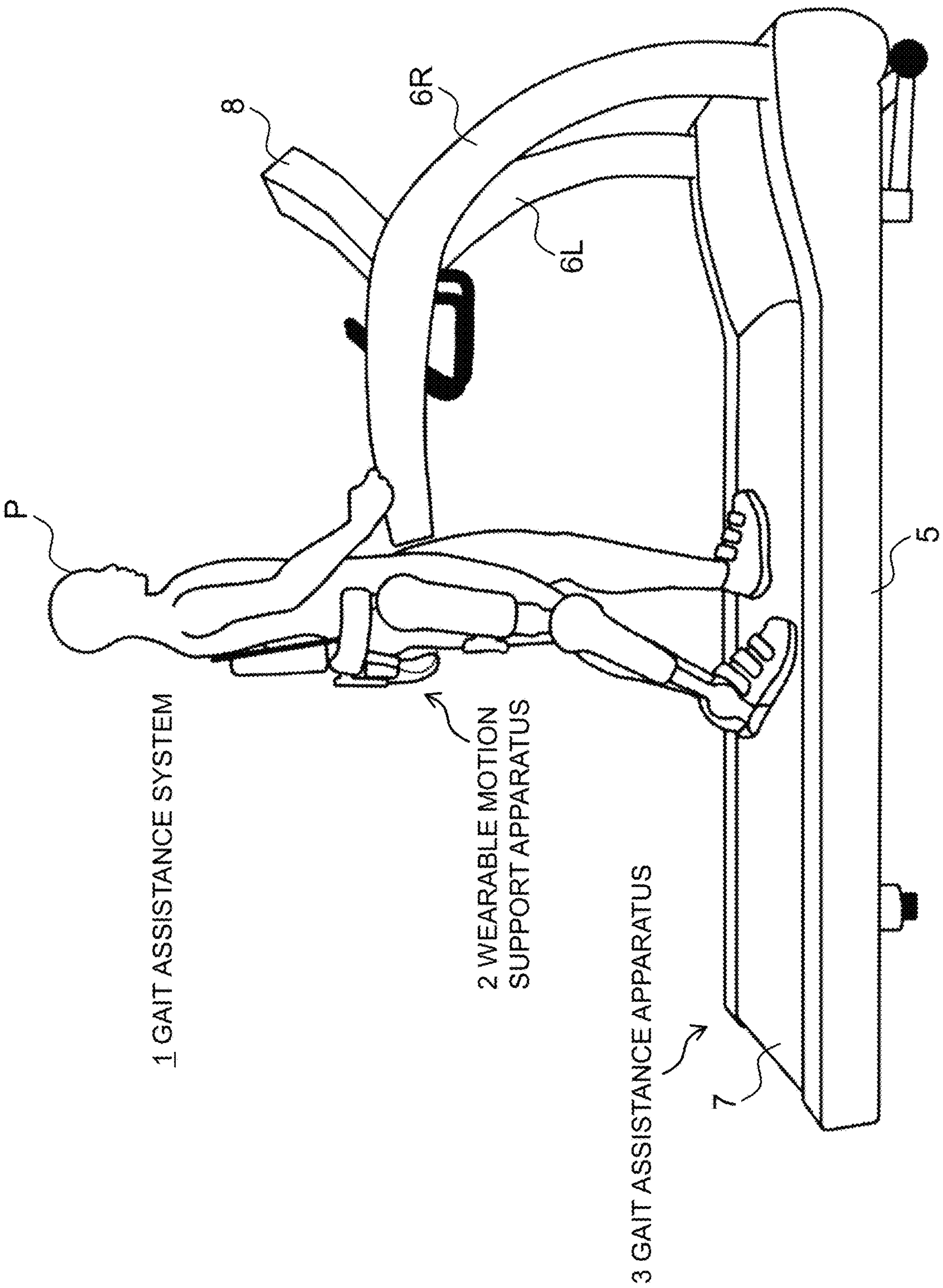
FIG. 1 is a conceptual diagram provided for explaining a gait assistance system according to the present embodiment.

FIG. 1 illustrates a gait assistance system 1 according to the present embodiment. The gait assistance system 1 includes a wearable motion support apparatus 2 that supports motion of a subject P, and a gait assistance apparatus 3 for assisting rehabilitation by gait motion of the subject P. The wearable motion support apparatus 2 is communicably coupled to the gait assistance apparatus 3 in a wired or wireless manner.

First, the gait assistance apparatus 3 is configured such that a left frame 6L and a right frame 6R having a pairwise relationship stand on both sides of a treadmill 5 while being curved from a distal end of the treadmill 5, so that the subject P can grasp end portions of the frames 6L and 6R with the hands.

The treadmill 5 has a treadmill belt 7 that moves so as to revolve by rotation of a roller. A revolving speed of the treadmill belt 7 can be changed by changing a rotation speed of the roller in accordance with driving of an actuator.

In the gait assistance apparatus 3, a monitor 8 formed with, for example, a liquid crystal display is provided at a subframe (not illustrated) that is bridged across the left frame 6L and the right frame 6R standing from the treadmill 5 so that an operation result on an operation unit and various kinds of information necessary for gait assistance of the subject are displayed as a video.

In this manner, the gait assistance system 1 can assist rehabilitation by gait motion while the subject P who wears the wearable motion support apparatus 2 stabilizes a posture during gait motion by grasping one ends of a pair of the left frame 6L and the right frame 6R in the gait assistance apparatus 3 with the hands.

Figure 2:
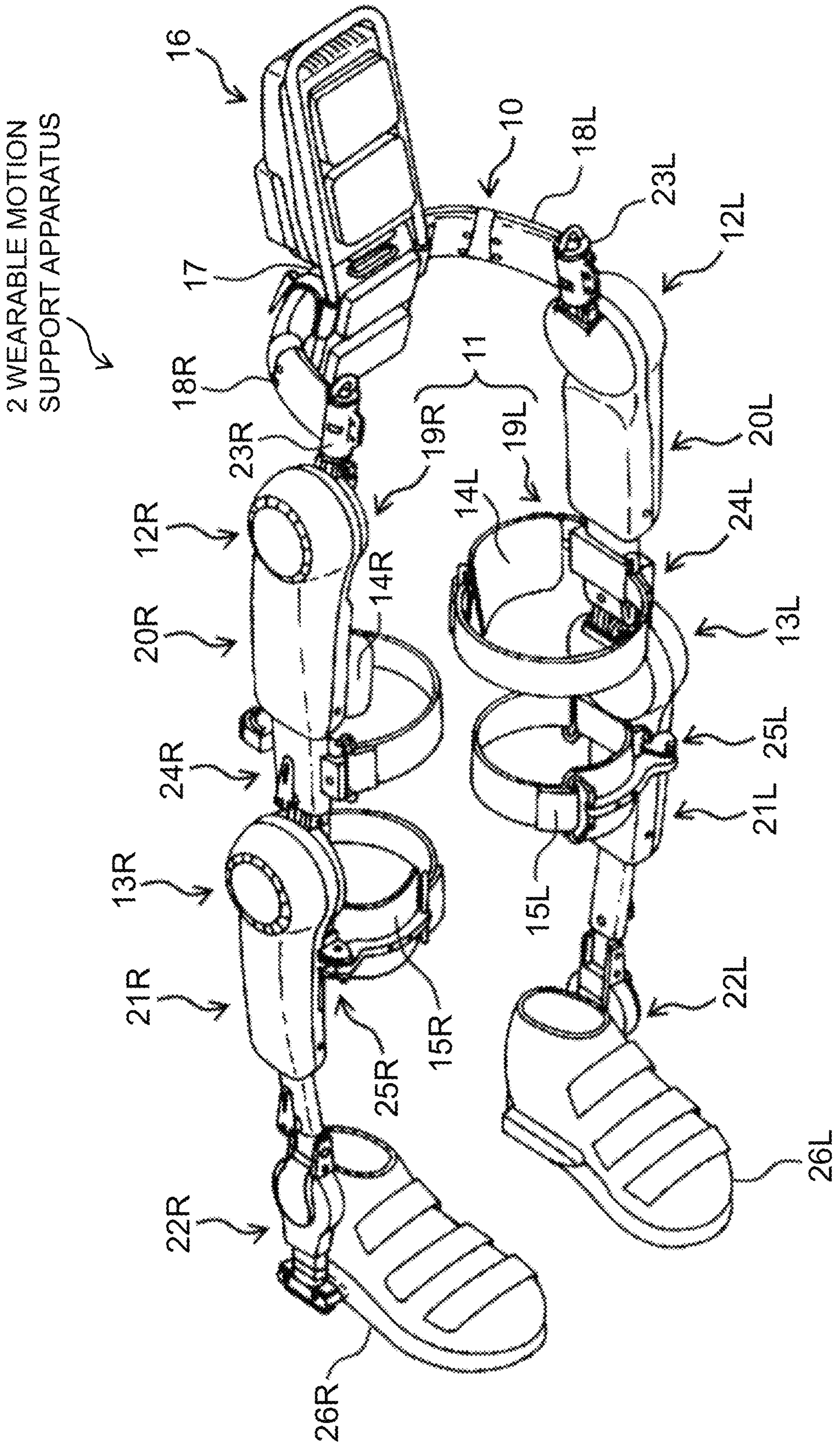
FIG. 2 is a perspective view illustrating an appearance configuration of a wearable motion support apparatus according to the present embodiment.

(2) Configuration of Wearable Motion Support Apparatus According to Present Embodiment FIG. 2 illustrates the wearable motion support apparatus 2 according to the present embodiment. The wearable motion support apparatus 2, which is an apparatus that provides to the subject, power in accordance with each of gait phases constituting the gait motion of the subject, operates to detect a biological potential signal (surface myoelectric potential) generated when muscle force is generated by a signal from the brain, and motion angles of the hip and the knee joints of the wearer and provide drive force from a drive mechanism based on the detection signal.

The wearable motion support apparatus 2 of a lower extremity type in the present embodiment includes a waist frame 10 to be worn on the waist of the subject, a lower extremity frame 11 to be worn on the lower extremity of the wearer, a plurality of drive units 12L, 12R, 13L and 13R provided on the lower extremity frame 11 so as to correspond to joints of the wearer, cuffs 14L, 14R, 15L and 15R as support power acting members attached on the lower extremity frame 11 so as to apply power of the drive units 12L, 12R, 13L and 13R to the wearer from the front or behind, a control apparatus 30 (FIG. 3 which will be described later) that controls the drive units 12L, 12R, 13L and 13R based on a signal caused by lower extremity motion of the wearer, a rear unit 16 on which the control apparatus is mounted, and an operation unit (not illustrated) to be used by a helper.

The control apparatus 30 (FIG. 3) can drive the lower extremity frame 11 relatively centering around output axes of actuators of the drive units 12L, 12R, 13L and 13R corresponding to the joints of the subject. Sensors for detecting drive torques, rotation angles, and the like, of the actuators are mounted at the respective drive units 12L, 12R, 13L and 13R. Note that a battery unit (not illustrated) for supplying a drive power supply of the whole apparatus is mounted on the rear unit 16.

The waist frame 10, which is a member having a substantially C shape in planar view opening forward so as to be able to accommodate the waist of the subject and surround the waist from the back side to both of the right and left side portions, includes a rear waist frame portion 17 located behind the subject, and a left waist frame portion 18L and a right waist frame portion 18R extending forward from the opposite ends of the rear waist frame portion 17 while being curved.

The left waist frame portion 18L and the right waist frame portion 18R are coupled to the rear waist frame portion 17 via an opening degree adjustment mechanism (not illustrated). Base portions of the left waist frame portion 18L and the right waist frame portion 18R are inserted and held within the rear waist frame portion 17 so as to be able to slide in a horizontal direction.

The lower extremity frame 11 includes a right lower extremity frame 19R to be worn on the right lower extremity of the subject, and a left lower extremity frame 19L to be worn on the left lower extremity of the subject. The left lower extremity frame 19L and the right lower extremity frame 19R are symmetrically formed.

The left lower extremity frame 19L includes a left thigh frame 20L located on the left side of the left thigh of the subject, a left lower thigh frame 21L located on the left side of the left lower thigh of the subject, and a left foot lower end frame 22L on which a sole of the left foot of the subject (in a case where the subject wears shoes, a sole of the left shoe) is to be placed. The left lower extremity frame 19L is coupled to a distal portion of the left waist frame portion 18L via a waist portion coupling mechanism 23L.

The right lower extremity frame 19R includes a right thigh frame 20R located on the right side of the right thigh of the subject, a right lower thigh frame 21R located on the right side of the right lower thigh of the subject, and a right foot lower end frame 22R on which a sole of the right foot of the subject (in a case where the subject wears shoes, a sole of the right shoe) is to be placed. The right lower extremity frame 21R is coupled to a distal portion of the right waist frame portion 18R via a waist portion coupling mechanism 23R.

Note that each of the waist frame 10 (the rear waist frame 17, the right waist frame 18R and the left waist frame 18L) and the lower extremity frame 11 (the right lower extremity frame 19R and the left lower extremity frame 19L) is formed to have a frame body formed in an elongated plate shape with, for example, a metal such as stainless or carbon fiber and to be light and have high stiffness. In the present embodiment, as a strengthening member, carbon fiber reinforced plastic (CFRP) and extra super duralumin which is an aluminum alloy are used.

The cuffs 14L, 14R, 15L and 15R are respectively provided at the left thigh frame 20L, the right thigh frame 20R, the left lower thigh frame 21L and the right lower thigh frame 21R.

The cuffs 14L and 14R provided at the left thigh frame 20L and the right thigh frame 20R (hereinafter, described as "thigh cuffs") are supported by thigh cuff support mechanisms 24L and 24R attached to lower end portions of the thigh frame bodies. The thigh cuffs 14L and 14R have wearing surfaces curved in an arc shape that can be abut and attached so as to be fitted to the thighs of the subject. Fitting members that can be tightly attached to the thighs of the subject are attached on the wearing surfaces of the thigh cuffs 14L and 14R.

The cuffs 15L and 15R provided at the left lower thigh frame 21L and the right lower thigh frame 21R (hereinafter, described as "lower thigh cuffs") are supported by lower thigh cuff support mechanisms 25L and 25R attached to upper end portions of upper elements. The lower thigh cuffs 15L and 15R have wearing surfaces curved in an arc shape that can be abut and attached so as to be fitted to the lower thighs of the subject. Fitting members that can be tightly attached to the lower thighs of the subject are attached on the wearing surfaces of the lower thigh cuffs 15L and 15R.

In a case where this wearable motion support apparatus 2 is actually worn on the subject, dedicated shoes 26L and 26R are respectively worn on left and right foot portions, the lower thigh cuffs 15L and 15R are respectively worn on the left and right lower thigh portions, and further, the thigh cuffs 14L and 14R are respectively worn on the left and right thigh portions. Then, belts, or the like, are fastened on the shoes and the cuffs so that the foot portions, the lower thigh portions and the thigh portions are integrated with the corresponding frames.

The dedicated shoes 26L and 26R constitute a pair of shoes, tightly hold portions from the toes to the ankles of the subject and can measure a load with a floor reaction force sensor (an FRF sensor 51 which will be described later) provided on the soles of the feet.

In this manner, the wearable motion support apparatus 2 can control and support gait motion based on a biological potential signal associated with voluntary muscle activity in accordance with a will of the subject who wears the apparatus.

(3) Internal System Configuration in Wearable Motion Support Apparatus

Figure 3:
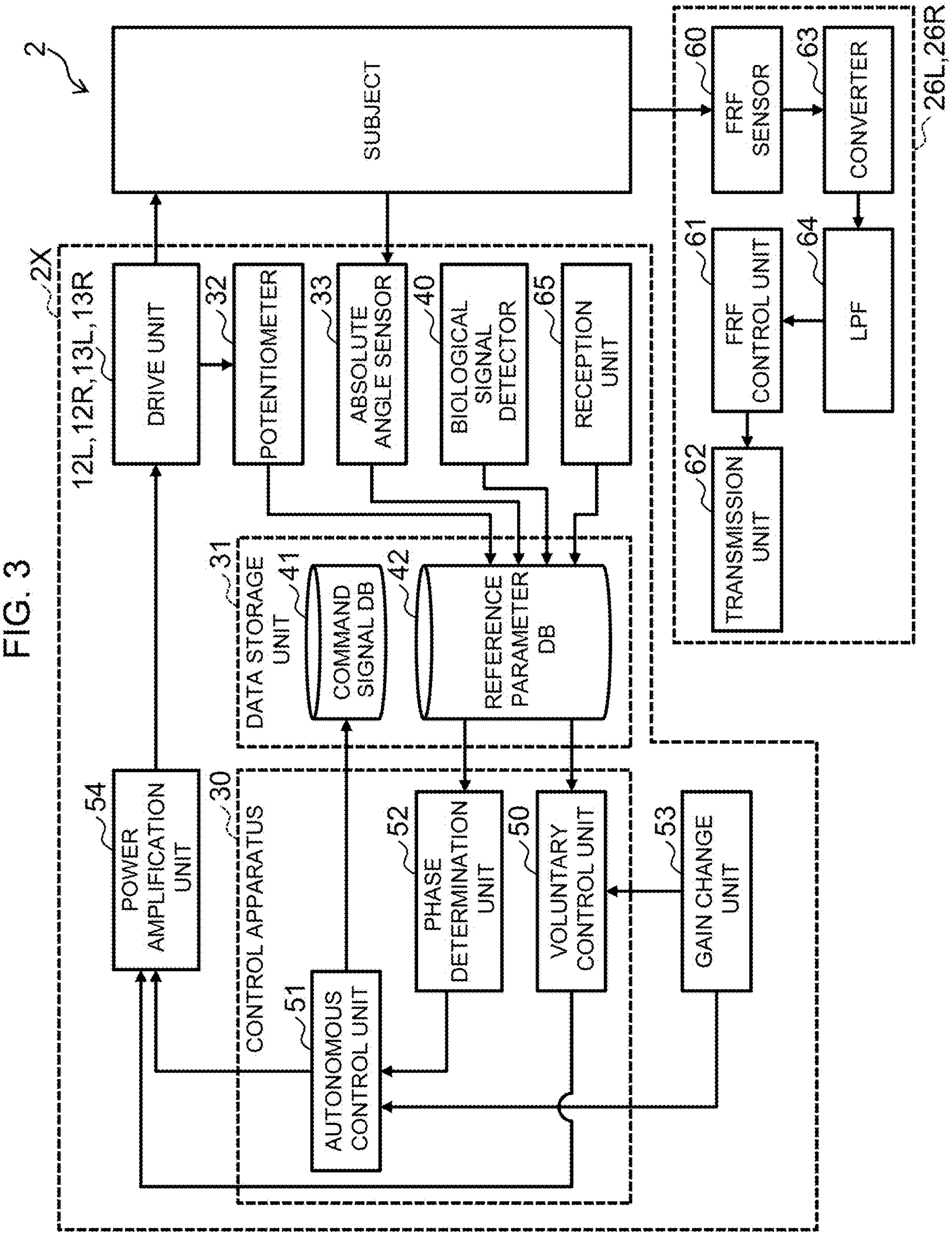
FIG. 3 is a block diagram illustrating an internal configuration of the wearable motion support apparatus according to the present embodiment.

FIG. 3 is a block diagram illustrating a configuration of a control system of the wearable motion support apparatus 2. As illustrated in FIG. 3, a control system 2X of the wearable motion support apparatus 2 includes a control apparatus 30 that performs overall control of the whole system, a data storage unit 31 in which various kinds of data are made a database in a readable and writable manner in accordance with a command of the control apparatus 30, and drive units 12L, 12R, 13L and 13R that actively or passively perform driving in coordination with the lower extremity motion of the subject.

Further, potentiometers 32 that detect rotation angles of output axes of actuators at the drive units 12L, 12R, 13L and 13R are provided coaxially with the output axes and detect joint angles in accordance with the lower extremity motion of the subject.

Further, an absolute angle sensor 33 for measuring an absolute angle with respect to a vertical direction of the thigh portion is mounted on the lower extremity frame 11. The absolute angle sensor 33 includes an acceleration sensor and a gyro sensor and is used in sensor fusion that is a method for extracting new information using a plurality of pieces of sensor data.

A primary filter is used in calculation of the absolute angle of the thigh portion to eliminate influence of translational motion and temperature drive at the respective sensors. The primary filter performs calculation by performing addition while providing weight to values obtained from the respective sensors.

In a case where the absolute angle with respect to the vertical direction of the thigh portion is set as θabs(k), angular velocity obtained by the gyro sensor is set as ω, a sampling cycle is set as dt, and acceleration obtained by the acceleration sensor is set as α, θabs(t) is expressed as the following expression (1).

[Math. 1]

$$\theta_{abs}(k)=0.95\times(\theta_{abs}(k-1)+\omega dt)+0.05\times\alpha \quad (1)$$

A biological signal detection unit 40 including biological signal detection sensors (electrodes) is disposed in a region of a body surface (mainly, a region of a body surface of the thigh portion) of the subject based on joints associated with the lower extremity motion of the subject and detects a biological potential signal for causing knee joints of the subject to move.

In the data storage unit 31, a command signal database 41 and a reference parameter database 42 are stored. The control apparatus 30 is constituted with, for example, a central processing unit (CPU) chip having a memory, and includes a voluntary control unit 50, an autonomous control unit 51, a phase determination unit 52, and a gain change unit 53.

The voluntary control unit 50 causes the drive units 12L, 12R, 13L and 13R to generate power in accordance with a will of the subject based on the biological potential signal acquired by the biological signal detection unit 40. Specifically, the voluntary control unit 50 supplies a command signal in accordance with a detection signal of the biological signal detection unit 40 to a power amplification unit 54. The voluntary control unit 50 applies a predetermined command function f(t) or a gain P to the biological signal detection unit 40 to generate a command signal. This gain P is a value or a function set in advance and can be adjusted via the gain change unit 53 through external input.

Further, it is also possible to select a method of controlling drive torques (magnitudes and rotation angles of the torques) of the actuators based on angle data of the knee joints detected by the potentiometers 32. This method is effective in a case where a degree of gait disorder in association with motion symptoms of the subject is relatively mild, in a case where it is assumed that the skin of the subject will get wet with sweat and there is a possibility that an input of a biological signal cannot be obtained from the biological signal detection unit 40, or the like.

Data of the knee joint angles detected by the potentiometers 32, data of the absolute angle with respect to the vertical direction of the thigh portion detected by the absolute angle sensor 33, and the biological signal detected by the biological signal detection unit 40 are input to the reference parameter database 42.

Further, floor reaction force (FRF) sensors 60 are provided on the soles of the pair of dedicated shoes 26L and 26R and detect a pressure distribution to the sole surfaces of right and left feet of the subject. The FRF sensors 60 can independently measure loads on the sole surfaces while dividing the sole surfaces into front portions (toe portions) of the feet and rear portions (heel portions) of the feet.

The FRF sensors 60, which include, for example, a piezoelectric element that outputs a voltage in accordance with an applied load, a sensor whose electrostatic capacitance changes in accordance with a load, and the like, can respectively detect load change in association with weight shift and whether or not the foot of the wearer contacts the ground.

Further, with the pair of dedicated shoes 26L and 26R, a position of the center of gravity can be obtained from balance of loads applied to the sole surfaces of the right and left feet based on the detection results of the respective FRF sensors 60. In this manner, with the pair of dedicated shoes 26L and 26R, on which of the left and right feet of the subject, the center of gravity is biased can be estimated based on the data measured at the respective FRF sensors 60.

Each of the dedicated shoes 26L and 26R includes an FRF control unit 61 constituted with the FRF sensor 60 and a micro control unit (MCU) and a transmission unit 62 in addition to a shoe structure. An output of the FRF sensor 60 is converted into a voltage via a converter 63 and then, input to the FRF control unit 61 while a high frequency band is cut off via a low pass filter (LPF) 64.

The FRF control unit 61 obtains load change in association with weight shift of the subject and whether or not the foot contacts the ground and obtains the position of the center of the gravity in accordance with the load balance related to the soles of the right and left feet based on the detection results of the FRF sensors 60. The FRF control unit 61 wirelessly transmits the obtained position of the center of gravity to a reception unit 65 inside the apparatus body via the transmission unit 53 as FRF data.

After the control apparatus 30 receives the FRF data wirelessly transmitted from the transmission unit 62 of each of the dedicated shoes 26L and 26R via the reception unit 65, the control apparatus 30 stores the loads related to the soles of the right and left feet and the position of the center of gravity based on the FRF data in the reference parameter database 42 of the data storage unit 31.

The phase determination unit 52 compares the data of the knee joint angles detected by the potentiometers 32 and the data of the loads detected by the FRF sensors 60 with knee joint angles and loads of reference parameters stored in the reference parameter database 42. The phase determination unit 52 determines a phase of motion of the subject based on the comparison result.

Then, when the autonomous control unit 51 obtains control data of the phase determined by the phase determination unit 52, the autonomous control unit 51 generates a command signal in accordance with the control data of the phase and supplies a command signal for causing the drive units 12L, 12R, 13L and 13R to generate power to the power amplification unit 54.

Further, the autonomous control unit 51 receives an input of a gain adjusted by the gain change unit 53 described above, generates a command signal in accordance with the gain and outputs the command signal to the power amplification unit 54. The power amplification unit 54 controls currents that drive the actuators of the drive units 12L, 12R, 13L and 13R to control magnitudes and rotation angles of the torques of the actuators, thereby provides assist force by the actuators to the knee joints of the subject.

In this manner, the autonomous control unit 51 determines each of gait phases in accordance with the gait task of the subject based on the physical amount detected by the periarticular detection unit (the potentiometers 32 and the absolute angle sensor 33) and causes the drive units 12L, 12R, 13L and 13R to generate power corresponding to each of the gait phases.

The power amplification unit (drive current generation unit) 54 synthesizes a control signal from the voluntary control unit 50 and a control signal from the autonomous control unit 51, amplifies a drive current in accordance with the synthesized control signal and supplies the drive current to the drive units 12L, 12R, 13L and 13R. The torques of the actuators are transmitted to the knee joints of the subject as assist force via the lower extremity frame.

(4) Configuration of Function Improvement Assistance Apparatus According to Present Embodiment In the present invention, a function improvement assistance apparatus 70 (FIG. 4 which will be described later) using the above-described wearable motion support apparatus 2 contributes to not only improvement in the gait function of the subject but also mental improvement of the subject.

As the premises, the biological potential signal of the muscles of the lower extremity measured using the wearable motion support apparatus 2 is muscle activity of the subject measured every time gait treatment is performed using the wearable motion support apparatus 2, and thus, may be useful for evaluation of the gait function of the subject. The biological potential signal reflects change of a neuromuscular system of the subject caused by an action potential generated during motion control.

Attention is focused on a signal pattern of the biological potential signal, and the signal pattern is utilized as an index of the gait evaluation. The signal pattern of the biological potential signal obtained from a skin surface around the muscles of the lower extremity changes in accordance with muscle activity during gait.

In normal gait of a healthy subject who does not wear the wearable motion support apparatus 2, a signal pattern of the biological potential signal has features for each measurement site. It is considered that a signal pattern of the biological potential signal of the subject who wears the wearable motion support apparatus 2 may also have features in a similar manner, and activity of the neuromuscular system during gait can be recorded by analyzing the signal pattern. Further, there is a possibility that a relationship between gait ability of the subject and the signal pattern of the biological potential signal measured when the subject who wears the wearable motion support apparatus 2 performs gait can be applied to gait evaluation of the subject under treatment.

Thus, in the present invention, a correlation between the signal pattern and gait ability of the subject is confirmed by quantifying the signal pattern of the biological potential signal obtained from the subject under treatment using the wearable motion support apparatus 2 and performing evaluation by comparing the signal pattern with the signal pattern of the biological potential signal corresponding to the healthy subject.

Figure 4:
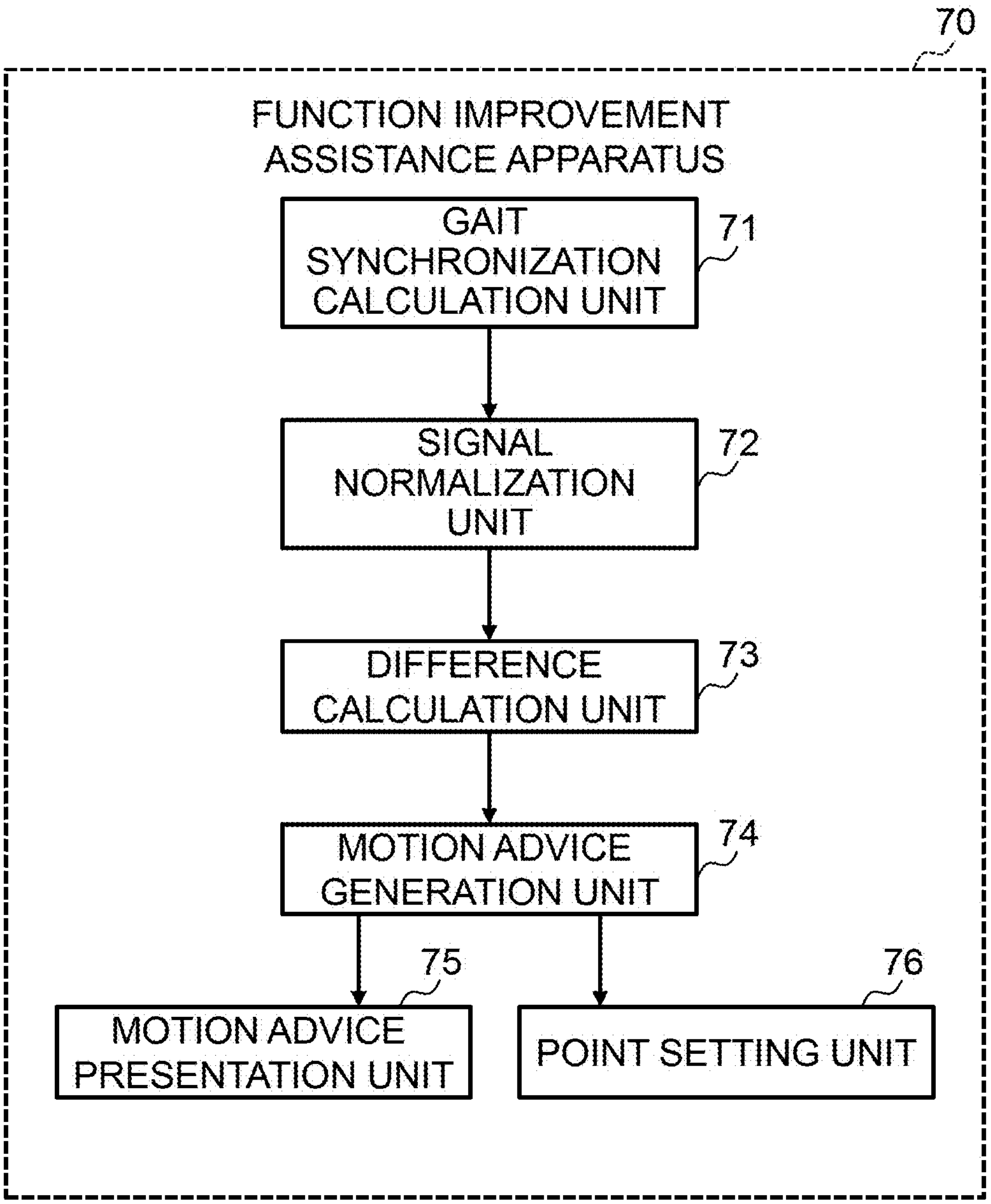
FIG. 4 is a block diagram illustrating an internal configuration of a function improvement assistance apparatus using the wearable motion support apparatus.

The function improvement assistance apparatus 70, which is a control-system component provided within the control apparatus 30 in the above-described wearable motion support apparatus 2, includes a gait synchronization calculation unit 71, a signal normalization unit 72, a difference calculation unit 73, a motion advice generation unit 74, a motion advice presentation unit 75, and a point setting unit 76 as illustrated in FIG. 4.

First, the biological potential signal and data (gait cycle) regarding a walk test are acquired from the subject using the wearable motion support apparatus 2. Specifically, in treatment for the subject who suffers a progressive neuromuscular disease using the wearable motion support apparatus 2, the subject needs to perform gait for approximately 20 to 40 minutes in one walk test. During this period, the wearable motion support apparatus 2 measures a biological potential signal obtained from extensor and flexor of the right and left knee joints and the hip and floor reaction force (FRF data) of the feet as time-series data.

Results of time-series data actually measured during treatment using the wearable motion support apparatus for seven subjects (Patient IDs: A to G) who suffer progressive neuromuscular diseases were used. Further, the subject regularly took a two-minute walk test (2MWT) to measure a gait distance for two minutes without wearing the wearable motion support apparatus 2 to reliably perform gait evaluation.

The seven subjects have taken the walk tests within past two years in a single facility. The walk tests performed during this test period and the number of 2MWT results were different for each subject. A table of FIG. 5 indicates disease details, sex, height, weight and the number of 2MWT results of each subject. In the table of FIG. 5, MD, ALS, IBM and SBMA of the disease details respectively indicate muscular dystrophy, amyotrophic lateral sclerosis, inclusion body myositis, and spinal and bulbar muscular atrophy.

Similarity between the signal patterns of the biological potential signals obtained from these subjects and the signal pattern of the biological potential signal obtained during gait of the healthy subject who wears the wearable motion support apparatus 2 in a similar manner, is judged through comparison.

In the gait assistance system 1 illustrated in FIG. 1 described above, the biological potential signal to be obtained from the right knee extensor of the healthy subject was measured while the healthy subject who wore the wearable motion support apparatus 2 performed gait on the treadmill 5. As the healthy subject, three healthy adult males (participants X to Z) from 21 years old to 23 years old were selected. The control parameters of the wearable motion support apparatus 2 and the travel speed of the treadmill belt 7 of the treadmill 5 were adjusted in advance so as to achieve a gait speed comfortable for each participant.

After the biological potential signals obtained from the right knee extensors of the participants X to Z were measured using the wearable motion support apparatus 2 and subjected to signal processing, an average value of signal patterns of the biological potential signals was obtained from 90 gait cycles per one participant, that is, a total of 270 gait cycles.

This average value of the signal patterns was used as a reference of the healthy subject and obtained through the following procedure 1 to 5. The biological potential signals were divided into gait cycles starting from a moment of contact of the right heel detected based on a value of the floor reaction force sensor (FRF sensor 60) (procedure 1). The gait cycles are resampled at 101 points at regular intervals from 0 to 100, and the biological potential signals were normalized in periods of each gait cycle. Further, the resampled values are interpolated using cubic spline interpolation (procedure 2).

Amplitudes of the biological potential signals were normalized for each gait cycle, and a maximum value was set at 100, and a basic value was set as 0 (procedure 3). For each sampling point, average values of 270 biological potential signals were obtained as a signal pattern that couples the average values (procedure 4). The signal pattern obtained as described above was normalized along with the amplitude based on a method similar to the method used in procedure 3. The signal pattern was set as a gait reference of the healthy subject using the wearable motion support apparatus 2 (procedure 5).

Figure 6:
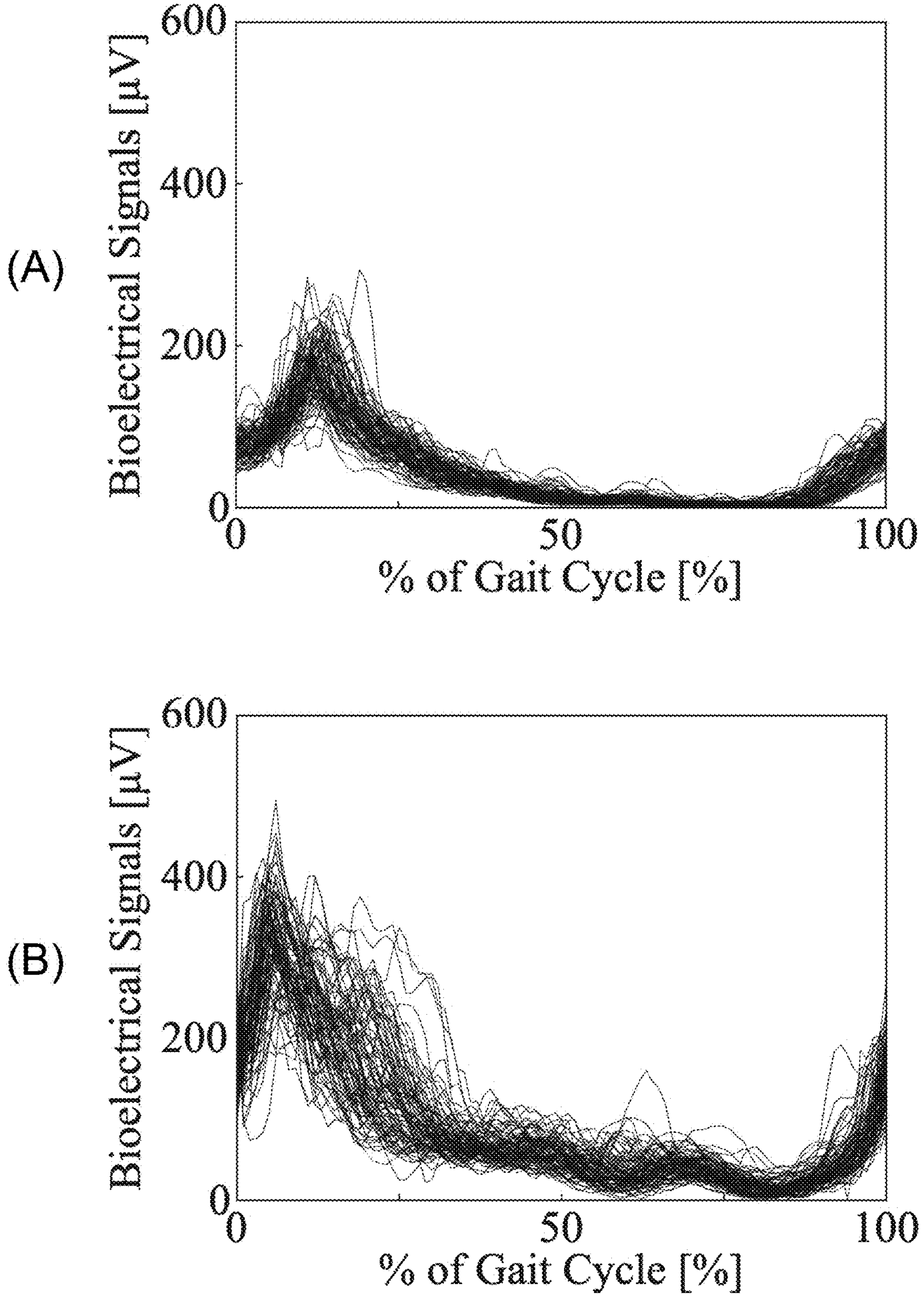
FIGS. 6(A)-(B) are graphs indicating a second signal pattern of a biological potential signal obtained from the right knee extensor of a healthy subject.
Figure 7:
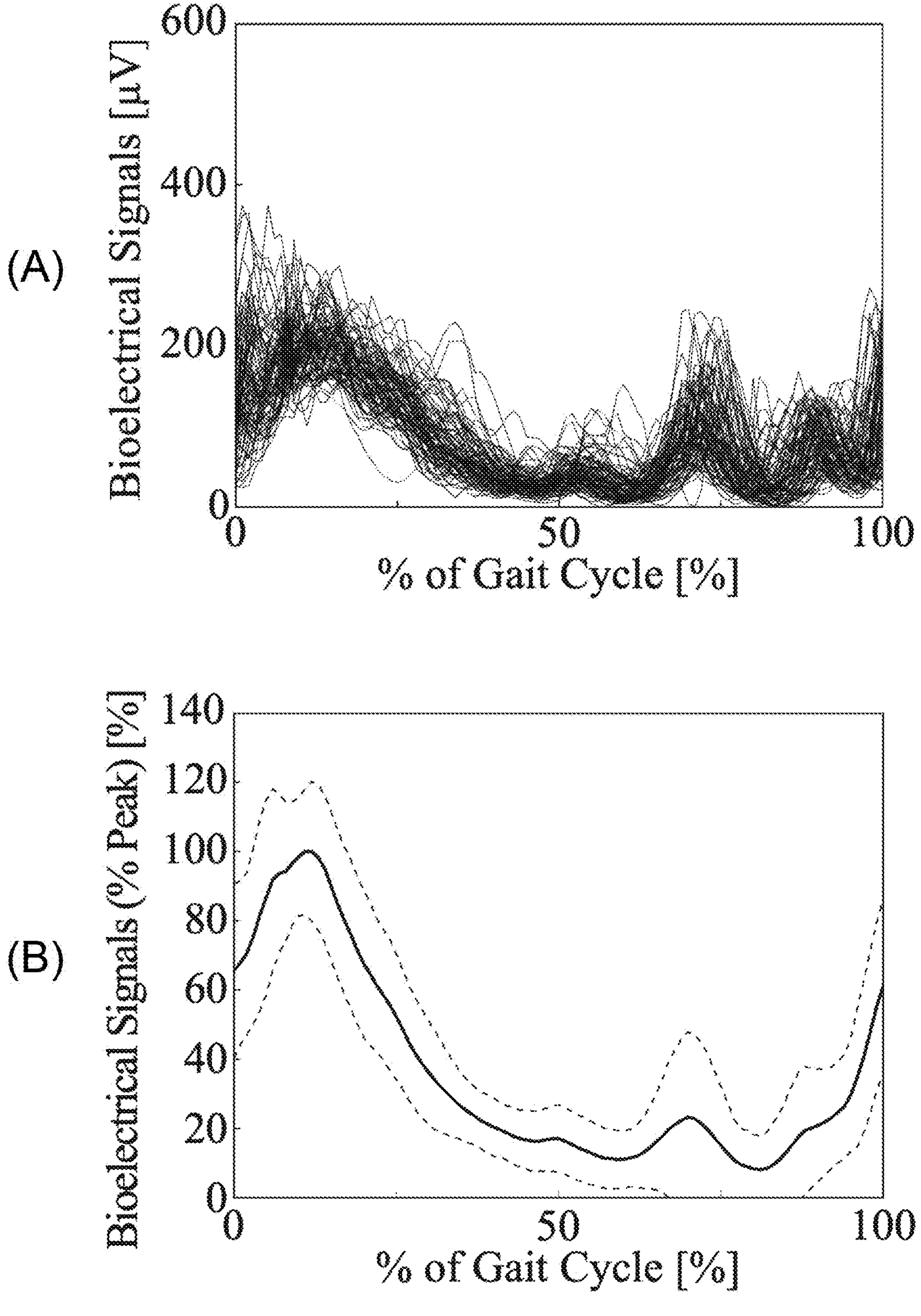
FIGS. 7(A)-(B) are graphs indicating a second signal pattern of a biological potential signal obtained from the right knee extensor of a healthy subject.

The signal patterns of the biological potential signals obtained from the right knee extensors for the healthy subjects (participants X to Z) who perform gait on the treadmill 5 while wearing the wearable motion support apparatus 2 are respectively indicated in FIGS. 6(A) and 6(B) and FIG. 7(A). FIG. 7(B) indicate an average value of a total of 270 gait patterns of the three participants, and a solid line and a dashed line respectively indicate ranges of an average value and standard deviation. The average pattern indicated in FIG. 7(B) is taken as the signal pattern of the biological potential signal that serves as a reference of the healthy subject and applied when determining similarity between the signal pattern of the subject and the signal pattern of the healthy subject.

To obtain the gait cycles described above, the gait synchronization calculation unit 71 illustrated in FIG. 4 calculates gait cycles of the subject based on the detection results of the floor reaction force sensors (FRF sensors 60) that detect a pressure distribution to the sole surfaces of the right and left feet of the subject.

The signal normalization unit 72 normalizes the biological potential signals detected by the biological signal detection unit 40 to a first signal pattern expressed in a planar coordinate system of time and an amplitude for each gait cycle based on the physical amount detected by the periarticular detection unit (the potentiometers 32 and the absolute angle sensor 33) and the gait cycle calculated from the gait synchronization calculation unit 71.

Figure 8:
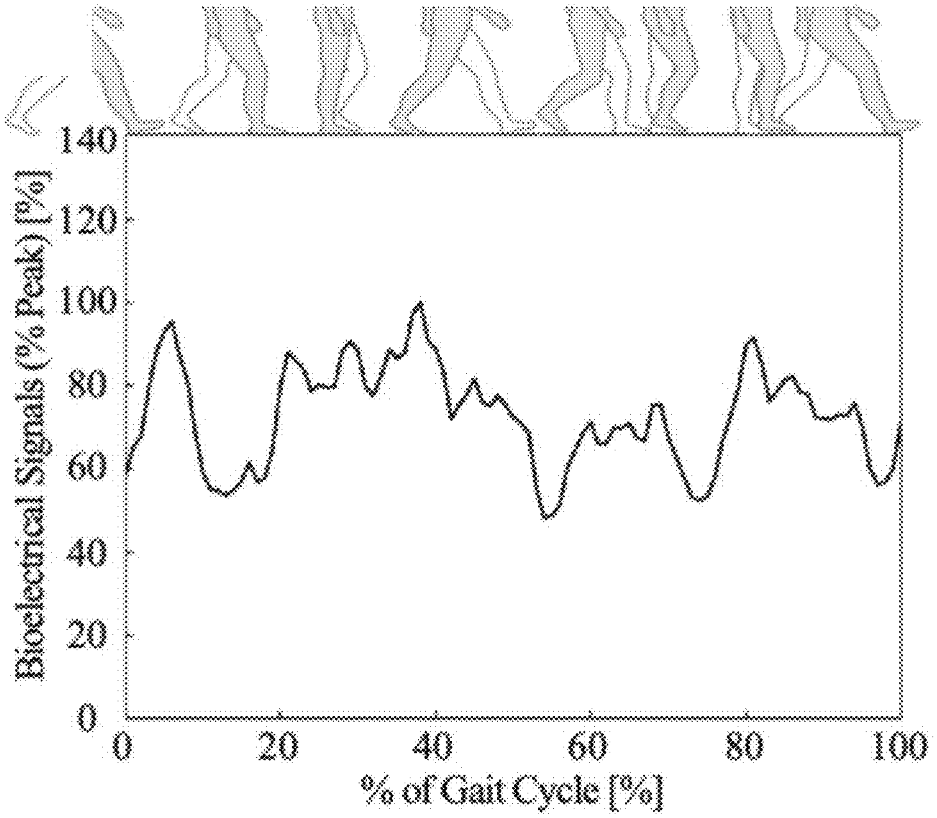
FIGS. 8(A)-(B) are graphs obtained by normalizing a first signal pattern of a biological potential signal.
Figure 8:
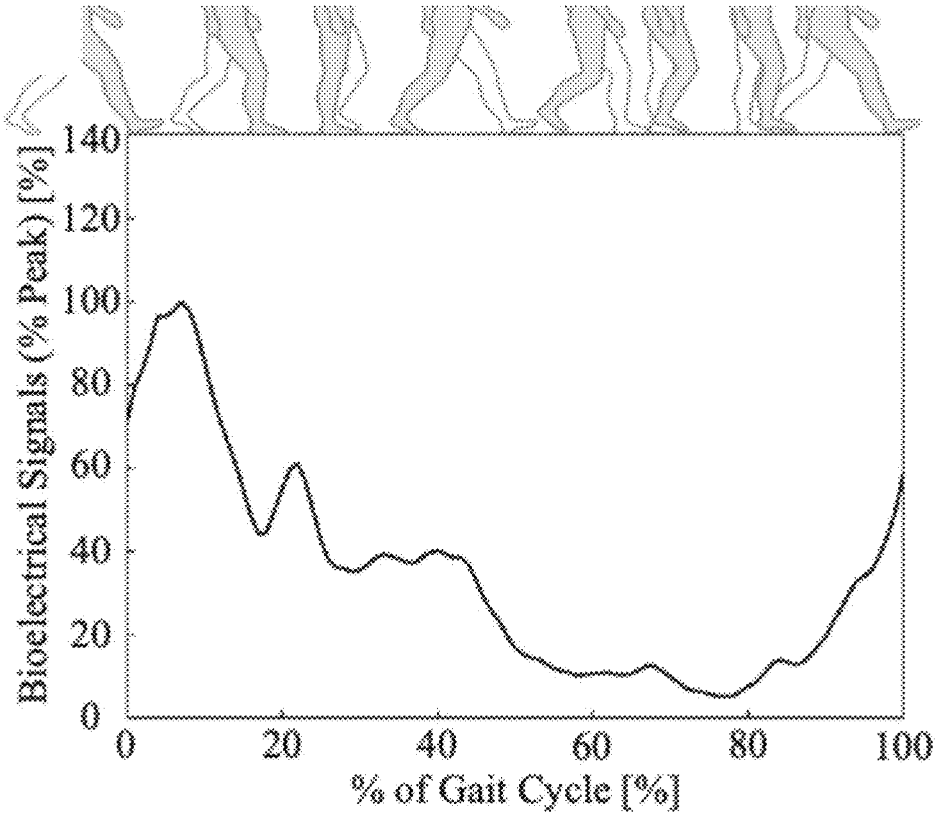

Specifically, in the present embodiment, the wearable motion support apparatus 2 measures a biological potential signal obtained from the right knee extensor of the subject who suffers a progressive neuromuscular disease and normalizes a signal pattern (first signal pattern) of the biological potential signal for each gait cycle regarding an amplitude and time, as indicated in FIGS. 8(A) and 8(B).

FIG. 8(A) is a graph obtained by normalizing a measurement result upon first trial, and FIG. 8(B) is a graph obtained by normalizing a measurement result three months later. These two normalized graphs are significantly different from each other, and the difference can be quantified by comparing and analyzing the signal pattern with a signal pattern (second signal pattern) of the biological potential signal obtained from the healthy subject.

The difference calculation unit 73 (FIG. 4) compares the first signal pattern of the biological potential signal obtained from the subject under treatment using the wearable motion support apparatus 2 with the second signal pattern of the biological potential signal obtained from the healthy subject and calculates a difference in a signal level for each gait time point in the gait cycle.

Figure 9:
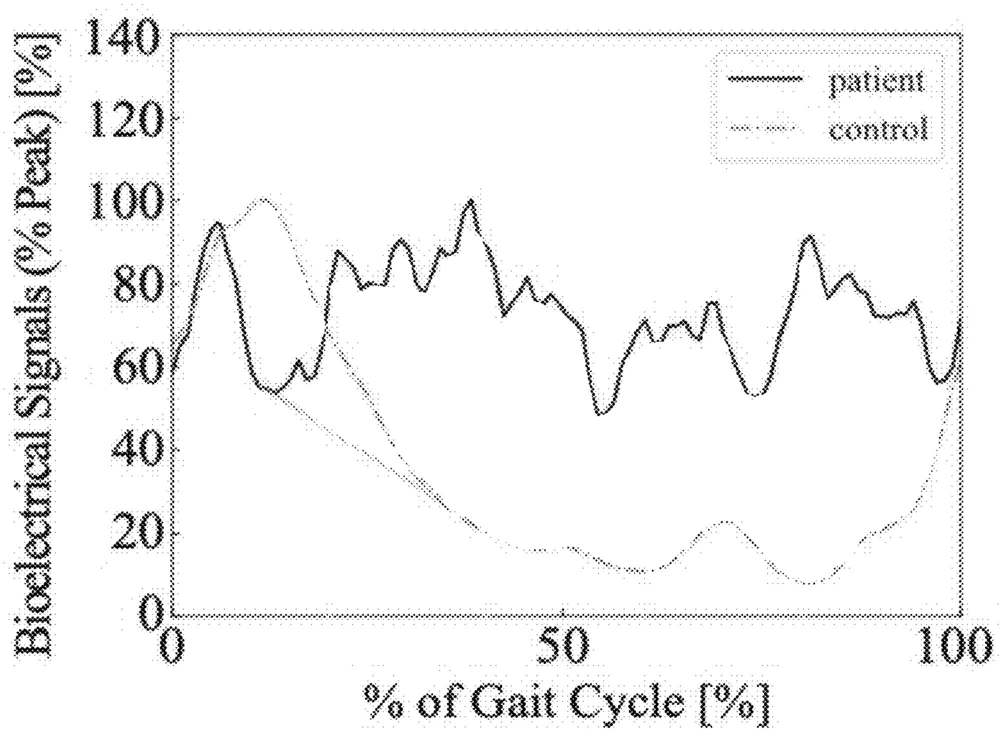
FIG. 9 is a normalized graph in which the first signal pattern and the second signal pattern are displayed in a superimposed manner.

A solid line in the normalized graph in FIG. 9 indicates the first signal pattern of the biological potential signal obtained from the subject under treatment using the wearable motion support apparatus 2, and a dashed line in the normalized graph indicates the second signal pattern of the biological potential signal obtained from the healthy subject during gait using the wearable motion support apparatus 2.

In FIG. 9, the second signal pattern corresponding to the healthy subject becomes maximum immediately after initial contact on a floor surface, decreases toward a swing phase and increases during the swing phase.

Subsequently, the motion advice generation unit 74 generates motion advice in the gait cycle so as to make the first signal pattern closer to the second signal pattern in a match direction and so as to reduce a difference amount at the same time based on the calculation result of the difference calculation unit 73.

Specifically, the motion advice generation unit 74 calculates a difference in a signal level of the first signal pattern from the second signal pattern including a positive or negative direction of the difference for all gait time points in the gait cycle. In this event, the motion advice generation unit 74 calculates a difference amount of the signal level of the first signal pattern with respect to the second signal pattern as an integral value in units of consecutive gait time points and judges whether or not the integral value continues to increase in one of the positive direction and the negative direction.

The motion advice generation unit 74 generates the motion advice in the gait cycle so as to make the first signal pattern closer to the second signal pattern in the match direction and so as to reduce the difference amount at the same time when the integral value increases by equal to or greater than a predetermined value in one of the positive direction and the negative direction for a plurality of gait time points.

For example, concerning a local section (a plurality of consecutive gait time points) in which the signal level of the first signal pattern is considerably lower than the signal level of the second signal pattern, the motion advice generation unit 74 generates an arrow mark in the match direction also in view of a position of the local section in the gait cycle and generates a message of "stronger for a second after starting swing" as the motion advice to encourage reduction in the difference amount of the signal level.

On the other hand, concerning a local section (a plurality of consecutive gait time points) in which the signal level of the first signal pattern is considerably higher than the signal level of the second signal pattern, the motion advice generation unit 74 generates an arrow mark in the match direction also in view of a position of the local section in the gait cycle and generates a message of "weaker after starting moving" as the motion advice to encourage reduction in the difference amount of the signal level.

The motion advice presentation unit 75 converts the motion advice generated by the motion advice generation unit 74 into one or both of image information and speech information and presents the one or both of the image information and the speech information to the subject. In other words, the motion advice presentation unit 75 includes a monitor 8 in the gait assistance apparatus 3 in the gait assistance system 1 (FIG. 1) described above and displays the normalized graph indicated in FIG. 8 as an image at the monitor 8.

Figure 10:
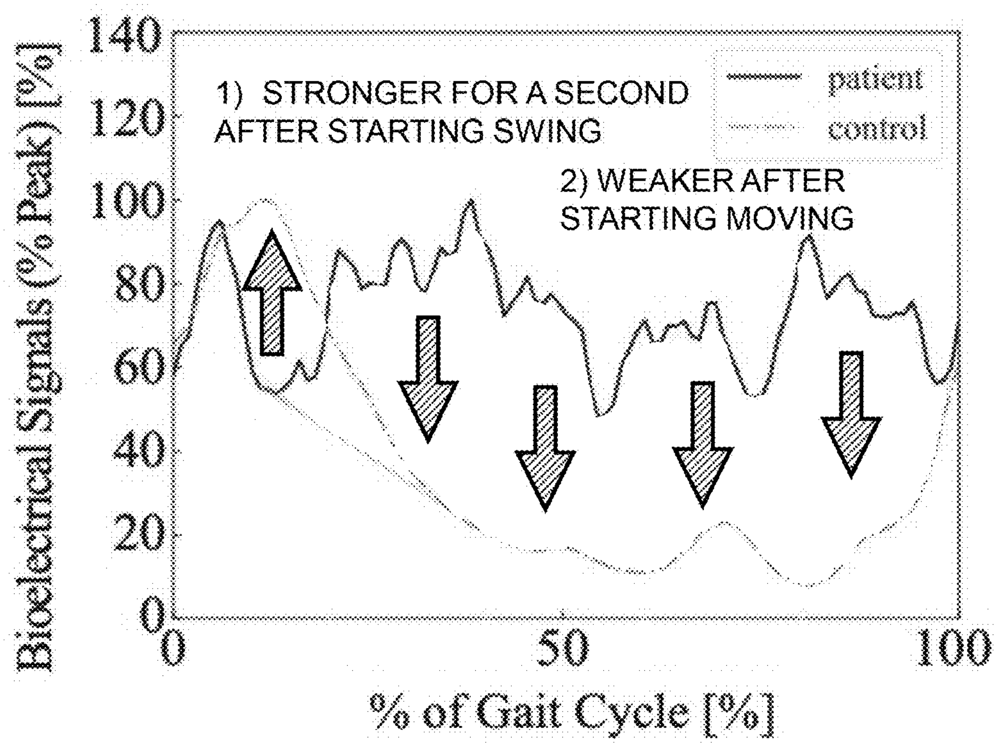
FIG. 10 is a graph to which image information is added to the normalized graph indicated in FIG. 8.

In FIG. 10 that is the same normalized graph as the normalized graph in FIG. 9 displayed as an image at the monitor 8, the motion advice presentation unit 75 converts the motion advice into an image representing the match direction and the difference amount of the first signal pattern with respect to the second signal pattern as the image information so as to be displayed in a superimposed manner on the first signal pattern and the second signal pattern normalized in the planar coordinate system by the signal normalization unit 72.

In other words, as indicated in FIG. 10, the image representing the match direction of the first signal pattern with respect to the second signal pattern as the image information is displayed in a superimposed manner as an arrow mark, and the image representing the difference amount is displayed in a superimposed manner on the corresponding local section in the gait cycle as a message.

Thus, in the function improvement assistance apparatus 70, the subject can confirm his/her gait motion one step at a time while viewing as a normalized planner image, how much degree the first signal pattern corresponding to his/her gait motion is different from the second signal pattern corresponding to the gait motion of the healthy subject.

In this manner, with the function improvement assistance apparatus 70, when the subject participates in rehabilitation through the gait motion using the wearable motion support apparatus 2, the subject can enjoy a sense of accomplishment of improvement in the gait function while viewing and listening to the motion advice for improving the gait function.

Further, in the function improvement assistance apparatus 70, the point setting unit 76 (FIG. 4) tallies up a degree of reduction in a difference at each gait time point in the gait cycle based on the calculation result of the difference calculation unit 73 obtained in a feedback manner and sets a point (such as a token as a token coin) in accordance with the tally result.

Specifically, a value obtained by squaring an integral value of a difference amount of a signal level of the biological potential signal in a local section (0 to 100%) in the gait cycle (standardized one-step section) is set as an evaluation index J, and the point setting unit 76 sets a point if a value of the evaluation index J becomes smaller than a value at start time (closer to reduction in the difference). The evaluation index J may be set so that a point is added in accordance with a degree of reduction from the start time or so that a point is set only in a case where the value exceeds a predetermined threshold.

As a result of this, with the function improvement assistance apparatus 70, in association with improvement in the gait function of the subject by the gait motion using the wearable motion support apparatus 2, by adding a point in accordance with the improved status, it is possible to improve a sense of accomplishment of the subject and lead to mental improvement.

(5) Other Embodiments

Note that while a case has been described above in the present embodiment where only the first signal pattern of the biological potential signal obtained from the right knee extensor of the subject is used as a target of improvement of the gait function, the present invention is not limited to this, and a signal pattern of the biological potential signal obtained by integrating a plurality of muscles necessary for gait of the subject may be applied to improvement of the gait function.

Further, while a case has been described in the present embodiment where rehabilitation is assisted while the subject is walking on the treadmill 5 of the gait assistance apparatus 3, the present invention is not limited to this, and the subject using the wearable motion support apparatus 2 may walk with a movable walker.

Further, while a case has been described in the present embodiment where the motion advice generation unit 74 generates the motion advice in the gait cycle so as to make the first signal pattern closer to the second signal pattern in the match direction and so as to reduce the difference amount at the same time based on the calculation result of the difference calculation unit 73, the present invention is not limited to this, and the motion advice may be generated mainly about a motion aspect including a gait time point at which a deviation rate of the difference amount is the highest among the motion aspects (local sections) constituting the gait cycle.

As a result of this, with the function improvement assistance apparatus 70, it is possible to present optimal motion advice to the subject by generating the motion advice mainly about the motion aspect that should be most improved in the gait cycle in units of one step.

Further, while a case has been described in the present embodiment where the point setting unit 76 tallies up a degree of reduction in a difference at each gait time point in the gait cycle based on the calculation result of the difference calculation unit 73 obtained in a feedback manner and sets a point in accordance with the tally result, in the present invention, in addition to this, charging processing of giving the set point back as part of a usage fee of the wearable motion support apparatus 2 may be performed.

As a result of this, with the function improvement assistance apparatus 70, the subject can receive an incentive of being able to reduce the usage fee in proportion to a treatment effect while participating in rehabilitation through gait motion using the wearable motion support apparatus 2, so that it is possible to contribute to improvement in motivation when the subject works to rehabilitate himself/herself.

REFERENCE SIGNS LIST

1 gait assistance system
2 wearable motion support apparatus
2X control system
3 gait assistance apparatus
5 treadmill
6L left frame
6R right frame
7 treadmill belt
8 monitor
10 waist frame
11 lower extremity frame
12L, 12R, 13L, 13R drive unit
26L, 26R dedicated shoe
30 control apparatus
31 data storage unit
32 potentiometer
33 Absolute angle sensor
40 biological signal detection unit
41 command signal database
42 reference parameter database
50 voluntary control unit
51 autonomous control unit
52 phase determination unit
53 gain change unit
54 power amplification unit
60 FRF sensor
61 FRF control unit
62 transmission unit
63 converter
64 LPF
65 reception unit
70 function improvement assistance apparatus
71 gait synchronization calculation unit
72 signal normalization unit
73 difference calculation unit
74 motion advice generation unit
75 motion advice presentation unit
76 point setting unit

The invention claimed is:

1. A function improvement assistance apparatus using a wearable motion support apparatus that provides to a subject, power in accordance with each of gait phases constituting gait motion of the subject, the wearable motion support apparatus comprising: a drive unit that actively or passively performs driving in coordination with lower extremity motion of the subject; a biological signal detection unit disposed in a region of a body surface of the subject based on joints associated with the lower extremity motion of the subject and including electrodes for detecting a biological potential signal of the subject; a voluntary control unit that causes the drive unit to generate power in accordance with a will of the subject based on the biological potential signal acquired by the biological signal detection unit; a periarticular detection unit that detects a physical amount around the joints associated with the lower extremity motion of the subject based on an output signal from the drive unit; an autonomous control unit that determines each of the gait phases in accordance with a gait task of the subject based on the physical amount detected by the periarticular detection unit and causes the drive unit to generate power corresponding to each of the gait phases; a drive current generation unit that synthesizes a control signal from the voluntary control unit and a control signal from the autonomous control unit and supplies a drive current in accordance with the synthesized control signal to the drive unit; a gait synchronization calculation unit that calculates a gait cycle of the subject based on a detection result of a floor reaction force sensor that detects a pressure distribution to sole surfaces of right and left feet of the subject; a signal normalization unit that normalizes the biological potential signal detected by the biological signal detection unit to a first signal pattern expressed in a planar coordinate system of time and an amplitude for each gait cycle based on the physical amount detected by the periarticular detection unit and the gait cycle calculated by the gait synchronization calculation unit; a difference calculation unit that compares the first signal pattern obtained from the signal normalization unit and a second signal pattern corresponding to a subject who serves as a reference and calculates a difference in a signal level for each gait time point in the gait cycle based on the comparison result; a motion advice generation unit that generates motion advice in the gait cycle so as to make the first signal pattern closer to the second signal pattern in a match direction and so as to reduce a difference amount at the same time based on the calculation result of the difference calculation unit; and a motion advice presentation unit that converts the motion advice generated by the motion advice generation unit into one or both of image information and speech information and presents the one or both of the image information and the speech information to the subject.

2. The function improvement assistance apparatus according to claim 1, wherein the motion advice generation unit generates the motion advice mainly about a motion aspect including a gait time point at which a deviation rate of the difference amount is the highest among motion aspects constituting the gait cycle.

3. The function improvement assistance apparatus according to claim 1, wherein the motion advice presentation unit converts the motion advice into an image representing the match direction and the difference amount of the first signal pattern with respect to the second signal pattern as the image information so as to be displayed in a superimposed manner on the first signal pattern and the second signal pattern normalized in the planar coordinate system by the signal normalization unit.

4. The function improvement assistance apparatus according to claim 1, comprising:

a point setting unit that tallies up a degree of reduction in a difference at each gait time point in the gait cycle based on a calculation result of the difference calculation unit obtained in a feedback manner and sets a point in accordance with the tally result.

5. The function improvement assistance apparatus according to claim 4, wherein the point setting unit performs charging processing of giving the set point back as part of a usage fee of the wearable motion support apparatus.

6. A function improvement assistance method using a wearable motion support apparatus that provides to a subject, power in accordance with each of gait phases constituting gait motion of the subject, the wearable motion support apparatus including a drive unit that actively or passively performs driving in coordination with lower extremity motion of the subject, performing synthesized control of voluntary control of causing the drive unit to generate power in accordance with a will of the subject based on a biological potential signal acquired from a region of a body surface of the subject based on joints associated with the lower extremity motion of the subject and autonomous control of determining each of gait phases in accordance with a gait task of the subject based on a physical amount around the joints associated with the lower extremity motion of the subject detected based on an output signal of the drive unit and causing the drive unit to generate power corresponding to each of the gait phases and supplying a drive current in accordance with the synthesized control to the drive unit, the function improvement assistance method comprising: a first step of normalizing the biological potential signal to a first signal pattern expressed in a planar coordinate system of time and an amplitude for each gait cycle based on a gait cycle calculated based on the physical amount around the joints and a detection result of a pressure distribution to sole surfaces of right and left feet of the subject; a second step of comparing the first signal pattern obtained from the first step and a second signal pattern corresponding to a subject who serves as a reference and calculating a difference in a signal level for each gait time point in the gait cycle based on the comparison result; a third step of generating motion advice in the gait cycle so as to make the first signal pattern closer to the second signal pattern in a match direction and so as to reduce a difference amount at the same time based on the calculation result in the second step; and a fourth step of converting the motion advice generated in the third step into one or both of image information and speech information and presenting the one or both of the image information and the speech information to the subject.

7. The function improvement assistance method according to claim 6, wherein in the third step, the motion advice is generated mainly about a motion aspect including a gait time point at which a deviation rate of the difference amount is the highest among motion aspects constituting the gait cycle.

8. The function improvement assistance method according to claim 6, wherein in the fourth step, the motion advice is converted into an image representing the match direction and the difference amount of the first signal pattern with respect to the second signal pattern as the image information so as to be displayed in a superimposed manner on the first signal pattern and the second signal pattern normalized in the planar coordinate system by the signal normalization unit.

9. The function improvement assistance method according to claim 6, comprising:

a fifth step of tallying up a degree of reduction in a difference at each gait time point in the gait cycle based on a calculation result in the second step obtained in a feedback manner and setting a point in accordance with the tally result.

10. The function improvement assistance method according to claim 9, wherein in the fifth step, charging processing of giving the set point back as part of a usage fee of the wearable motion support apparatus is performed.

* * * * *